United States Patent
Staeck

(10) Patent No.: US 11,855,310 B2
(45) Date of Patent: Dec. 26, 2023

(54) FLOW-FIELD PLATE

(71) Applicants: AUDI AG, Ingolstadt (DE); Volkswagen AG, Wolfsburg (DE)

(72) Inventor: Rune Staeck, Gifhorn (DE)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 220 days.

(21) Appl. No.: 16/977,007

(22) PCT Filed: Mar. 24, 2020

(86) PCT No.: PCT/EP2020/058140
§ 371 (c)(1),
(2) Date: Aug. 31, 2020

(87) PCT Pub. No.: WO2020/224860
PCT Pub. Date: Nov. 12, 2020

(65) Prior Publication Data
US 2022/0059853 A1 Feb. 24, 2022

(30) Foreign Application Priority Data
May 8, 2019 (DE) .................. 10 2019 206 577.5

(51) Int. Cl.
*H01M 8/0258* (2016.01)
*H01M 8/04119* (2016.01)
(Continued)

(52) U.S. Cl.
CPC .......... *H01M 8/0258* (2013.01); *B01D 45/08* (2013.01); *B01D 46/0031* (2013.01);
(Continued)

(58) Field of Classification Search
CPC ............. H01M 8/0258; H01M 8/2483; H01M 8/04164; H01M 8/04388; H01M 8/04395;
(Continued)

(56) References Cited

U.S. PATENT DOCUMENTS

| 2010/0009223 A1 | 1/2010 | Blanchet et al. |
| 2010/0098983 A1 | 4/2010 | Goto et al. |
| 2015/0333341 A1 | 11/2015 | Ban et al. |

FOREIGN PATENT DOCUMENTS

| DE | 10 2014 225 028 A1 | 11/2015 |
| JP | H09-266002 A | 10/1997 |

(Continued)

OTHER PUBLICATIONS

EPO machine generated English translation of KR101405737B1 (Year: 2014).*

*Primary Examiner* — Christopher P Domone
*Assistant Examiner* — Kimberly Wyluda
(74) *Attorney, Agent, or Firm* — Seed IP Law Group LLP

(57) ABSTRACT

A flow-field plate is provided for distributing a reactant to an electrode or a gas diffusion layer of a fuel cell, the flow-field plate having a gas inlet, and having a plurality of channels defining a flow field. A pressure gradient is present between the gas inlet and the flow field given a state of throughflow, which leads to an intake of exhaust gas flowing in the channels in the direction of the gas inlet. Furthermore, there is a water/gas separator which is fluidically connected to the gas inlet for separating liquid water and/or water vapor from a gas which is connected to the flow field in order to supply the gas separated in the water/gas separator to the flow field. A flow cross-section at the gas inlet or at the gas inlet region is smaller than the flow cross-section at or in the region of the water/gas separator.

10 Claims, 4 Drawing Sheets

(51) Int. Cl.
    *H01M 8/2483*    (2016.01)
    *H01M 8/0438*    (2016.01)
    *B01D 45/08*    (2006.01)
    *B01D 46/00*    (2022.01)
    *B01D 53/26*    (2006.01)

(52) U.S. Cl.
    CPC ...... *B01D 53/261* (2013.01); *H01M 8/04164* (2013.01); *H01M 8/2483* (2016.02); *H01M 8/04388* (2013.01); *H01M 8/04395* (2013.01)

(58) Field of Classification Search
    CPC ... B01D 45/08; B01D 46/0031; B01D 53/261
    See application file for complete search history.

(56) References Cited

FOREIGN PATENT DOCUMENTS

| | | |
|---|---|---|
| JP | 2002-280028 A | 9/2002 |
| JP | 2005-235571 A | 9/2005 |
| JP | 2008-311099 A | 12/2008 |
| JP | 2009-26526 A | 2/2009 |
| KR | 10-1405737 B1 | 6/2014 |

\* cited by examiner

FLOW-FIELD PLATE

TECHNICAL FIELD

Embodiments of the invention relate to a flow-field plate for distributing a reactant to an electrode or a gas diffusion layer of a fuel cell, having a gas inlet with a plurality of channels defining a flow field, wherein in a state of through-flow there is between the gas inlet and the flow field a pressure gradient which causes an exhaust gas flowing into the channels to be drawn toward the gas inlet, and also having a water/gas separator fluidically connected to the gas inlet for removing liquid water and/or water vapor from a gas, said separator being connected to the flow field in order to conduct to the flow field the gas separated off in the water/gas separator.

DESCRIPTION OF THE RELATED ART

A fuel cell system usually comprises a fuel cell stack consisting of a plurality of fuel cells, to which fuel is supplied on the anode side and a cathode gas, usually air, on the cathode side. In order to reduce fuel consumption, the fuel cell system has anode recirculation on the anode side, wherein the anode exhaust gas line arranged on the anode outlet side is usually connected to an anode supply line via the anode recirculation line so that unused fuel, in particular hydrogen, can be reintroduced into the fuel cell stack via the anode supply line. A water/gas separator which separates liquid water from gas is usually assigned to the anode exhaust gas line for this purpose. The fuel fed back to the anode supply line via the anode recirculation is usually introduced into the anode supply line by external components such as a jet pump, a recirculation blower. In this case, it is disadvantageous that these external components and their connection result in additional surfaces where heat losses can occur. Furthermore, due to the external components pressure losses arise, and additional installation space must be provided within the fuel cell system, thereby reducing the efficiency and operational stability of the fuel cell system.

KR 101405737 B1 and US 2010/0009223 A1 each describe a fuel cell stack. The flow-field plate has an integrated anode recirculation in which a water/gas separator is assigned to the flow-field plate and a pressure gradient is present between the flow field defined by a plurality of channels and the gas inlet of the flow-field plate, so that the exhaust gas flowing in the channels is sucked in the direction of the gas inlet.

BRIEF SUMMARY

It is an object of the present invention to provide a flow-field plate in which a more effective separation of liquid water and gas is enabled in order to make possible an effective anode recirculation integrated into the fuel cell stack.

The flow-field plate is distinguished in particular by a flow cross-section at the gas inlet or at the gas inlet region being smaller than the flow cross-section at or in the region of the water/gas separator. By widening the flow cross-section between the gas inlet and the water/gas separator, the gas/exhaust gas mixture flowing therein is decelerated so that a more effective separation of liquid water in the water/gas separator is made possible. In addition, this prevents liquid water from entering the anode chambers of the fuel cell stack and accompanying damage.

In this connection, the flow cross-section between the gas inlet and the water/gas separator may increase continuously. In an alternative embodiment, it is also possible for the flow cross-section between the gas inlet and the water/gas separator for one or more sections not to increase, i.e., to remain constant or become smaller. In this embodiment as well, the flow cross-section in the region of the water/gas separator is nevertheless larger than at the gas inlet or at the gas inlet region.

In order to enable a flow guide of the gas/exhaust gas that is as simple as possible, the increasing flow cross-section may be formed by means of a wall running at an angle with respect to an extension direction of the channels. This makes possible a widening flow guide and at the same time prevents the gas/exhaust gas mixture from flowing back into the channels of the flow field.

In this connection, it is particularly advantageous if the wall is guided at an angle up to an edge-side channel assigned to the water/gas separator in such a way that the gas separated in the water/gas separator is guided exclusively into the edge-side channel to then be distributed to the channels of the flow field. This prevents the separated gas or the gas/exhaust gas mixture from flowing back into the channels. At the same time, the gas/exhaust gas mixture is guided to the water/gas separator or through the water/gas separator. This ensures that liquid water and/or water vapor is separated from the exhaust gas.

In order to increase the suction effect and to improve the flow guidance, it is particularly advantageous, if a second wall is present, if the wall and the second wall are arranged facing and/or running toward each other, and if a passage is formed between the wall and the second wall. The exhaust gas exiting through the passage may thereby be mixed with the gas from the gas inlet. At the same time, this enables a compact design of the anode recirculation on the flow-field plate and effective flow guidance of the exhaust gas and the gas/exhaust gas mixture.

Furthermore, an outlet with an actuator may be assigned to the water/gas separator for discharging liquid water intermediately stored in the water/gas separator, and a third wall may be present which is arranged between the outlet and the wall such that the gas separated in the water/gas separator is guided to the flow field. In other words, a third wall is arranged between the outlet and a lateral channel assigned to the water/gas separator. The wall and the third wall are arranged at a distance from each other and facing and/or running toward each other and thus form a flow guide which guides the separated gas to the flow field. At the same time, a backflow of the separated gas is prevented, and flow of the gas into the water/gas separator or its outlet is prevented.

In one embodiment, the water/gas separator may be formed as an impact separator with at least one baffle plate. A plurality of baffle plates may be provided, wherein individual baffle plates are arranged perpendicular to the direction of extension of the channels. This improves the flow guidance of the gas/exhaust gas mixture and improves the separation rate. Alternatively or additionally, at least one of the baffle plates can also be formed at an angle to the direction of extension of the channels. The water/gas separator may have a reservoir for temporarily storing the separated liquid water.

In an alternative embodiment, the water/gas separator may be formed as a knitted-fabric separator. The knitted-fabric separator can be formed, for example, from a mesh, in particular from a plastic mesh. The separated water can thus be separated, collected and temporarily stored within the mesh.

Alternatively, the water/gas separator may also have or be formed from a porous material in which the deposited liquid water is stored.

In a further alternative embodiment, the water/gas separator takes the form of at least one hydrophilic or hygroscopic bar. This enables the deposition of the liquid water on the hydrophilic bars or the deposition and temporary storage of the liquid water in the hygroscopic bars. The water/gas separator may have a plurality of hydrophilic and/or hygroscopic bars. These may be formed at an angle to the direction of extension of the channels, which is accompanied by a increase in the separator surface of the water/gas separator.

For more effective feeding of fresh fuel into the flow-field plate, an ejector may be assigned to the gas inlet. The ejector may take the form of a nozzle.

The features and combinations of features mentioned above in the description and the features and combinations of features mentioned below in the description of the figures and/or shown in the figures alone can be used not only in the combination given in each case but also in other combinations or individually, without departing from the scope of the invention. Designs that are not explicitly shown or explained in the figures but result from and can be produced through separate combinations of features from the embodiments described are thus also to be regarded as covered and disclosed by the invention.

BRIEF DESCRIPTION OF THE SEVERAL VIEWS OF THE DRAWINGS

Additional advantages, features and details arise from the claims, the following description, and the drawings. The following are shown:

DETAILED DESCRIPTION

Figure 1:
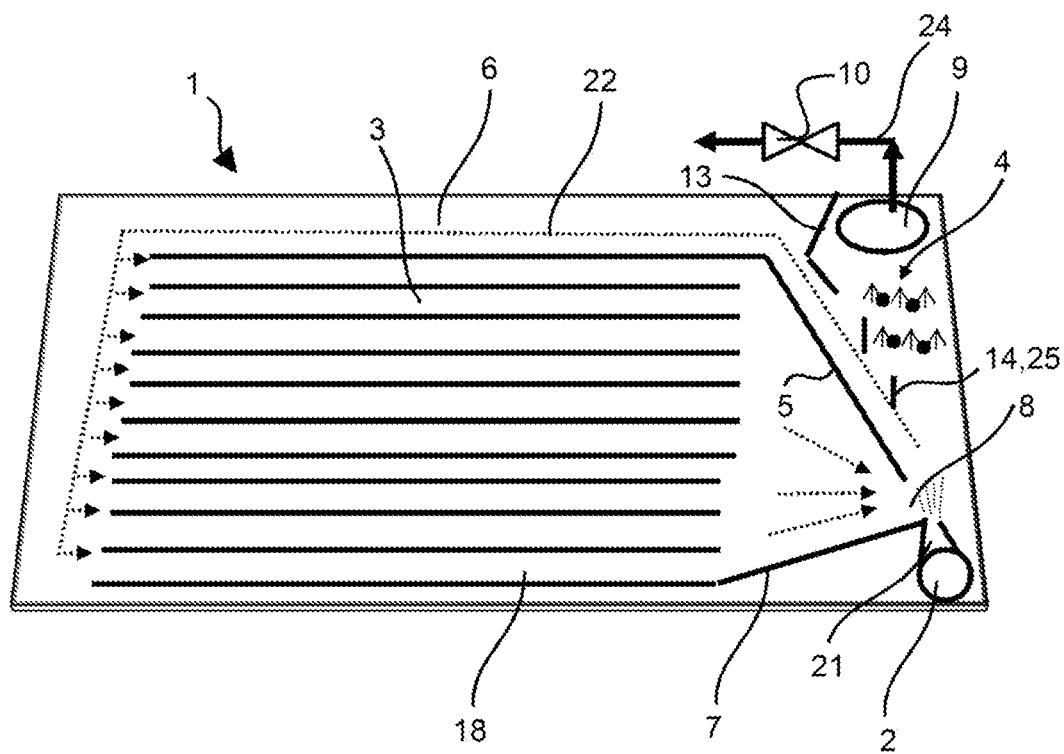
FIG. 1 schematically shows a first embodiment of the flow-field plate with a water/gas separator formed as an impact separator, FIG. 2 schematically shows a second embodiment of the flow-field plate with a water/gas separator taking the form of a knitted-fabric separator, FIG. 3 schematically shows a third embodiment of the flow-field plate with a water/gas separator comprising a plurality of hydrophilic or hygroscopic bars.

FIG. 1 shows a flow-field plate 1 for distributing a reactant to an electrode or gas diffusion layer of a fuel cell with a gas inlet 2. A plurality of channels 3 defining a flow field are arranged on the flow-field plate 1, a pressure gradient being present between the gas inlet 2 and the flow field given a state of flow. This pressure gradient leads to an intake of exhaust gas flowing in the channels 3 in the direction of the gas inlet 2. Furthermore, a water/gas separator 4 is arranged on the flow-field plate 1 for separating liquid water and/or water vapor from a gas, in particular from an exhaust gas, wherein the water/gas separator 4 is connected fluidically to the flow field in order to supply the gas separated in the water/gas separator 4 back to the flow field. In other words, the flow-field plate 1 enables an effective anode recirculation which is integrated in the fuel cell or is also inside the fuel cell. Exhaust gas is sucked out of the channels 3 of the flow field by the pressure gradient and mixed with fresh fuel from the gas inlet 2. This gas/exhaust gas mixture is supplied to the water/gas separator 4, wherein liquid water and/or water vapor is separated from the gas/exhaust gas mixture and is collected in the water/gas separator 4. The separated gas is returned from the water/gas separator 4 to the flow field and is thus introduced into the anode chambers of the fuel cell stack 16. The flow cross-section at the gas inlet 2 or also at the gas inlet region is smaller than the flow cross-section at or in the region of the water/gas separator 4.

In the present case, the flow cross-section between the gas inlet 2 and the separator elements 25 of the water/gas separator 4 increases continuously. Within the water/gas separator 4 itself, the flow cross-section decreases in the direction of its outlet 9. Nevertheless, the flow cross-section at the gas inlet is smaller than at the outlet 9 of the water/gas separator 4. The increase in the flow cross-section in the direction of the separator elements 25 allows the gas/exhaust gas mixture to be decelerated so that the separation or also the removal of liquid water and/or water vapor from the gas, that is to say in particular from the fuel, is improved. This prevents penetration of liquid water into the channels 3 of the flow field and condensation of the water vapor within the channels 3, thus preventing or reducing damage to the anode and hence to the fuel cell.

The increasing flow cross-section is formed by means of a wall 5 running at an angle with respect to an extension direction of the channels 3. This wall 5 is guided at an angle up to an edge-side channel 6 assigned to the water/gas separator 4 in such a way that the gas separated in the water/gas separator 4 is guided exclusively into the edge-side channel 6 in order to distribute it to the channels 3 of the flow field. This gas guidance prevents the gas/exhaust gas mixture from flowing or flowing back into the channels 3 of the flow field. At the same time, deceleration of the gas/exhaust gas mixture is achieved, thereby improving the separation rate. The flow guide 22 of the gas and of the gas/exhaust gas mixture is represented by the dotted line in FIGS. 1 to 3.

Furthermore, a second wall 7 is provided, wherein the wall 5 and the second wall 7 are arranged facing and running towards each other. A passage 8 is formed between the wall 5 and the second wall 7. This passage 8 in turn enables a flow guide 22 towards or close to the gas inlet 2 and thus enables the mixing of exhaust gas with fresh gas supplied via the gas inlet 2 in the inlet region. The second wall 7 may be arranged at an angle to a second edge-side channel 18. Furthermore, a third wall 13 is present. This is arranged between an outlet 9, assigned to the water/gas separator 4, and the wall 5 in such a way that the gas separated in the water/gas separator 4 is guided to the flow field, and backflow of the separated gas is prevented. An actuator 10 for discharging the liquid water collected in the water/gas separator 4 is also assigned to the outlet 9.

In the embodiment of FIG. 1, the water/gas separator 4 is formed as an impact separator with a plurality of baffle plates 14, wherein two of these baffle plates 14 shown by way of example are arranged perpendicular to the direction of extension of the channels 3. Another of the baffle plates 14 is arranged at an angle to the direction of extension of the channels 3 and approximately parallel to the wall 5, whereby a flow guide 22 from the water/gas separator 4 to the edge-side channel 6 is made possible.

Figure 2:
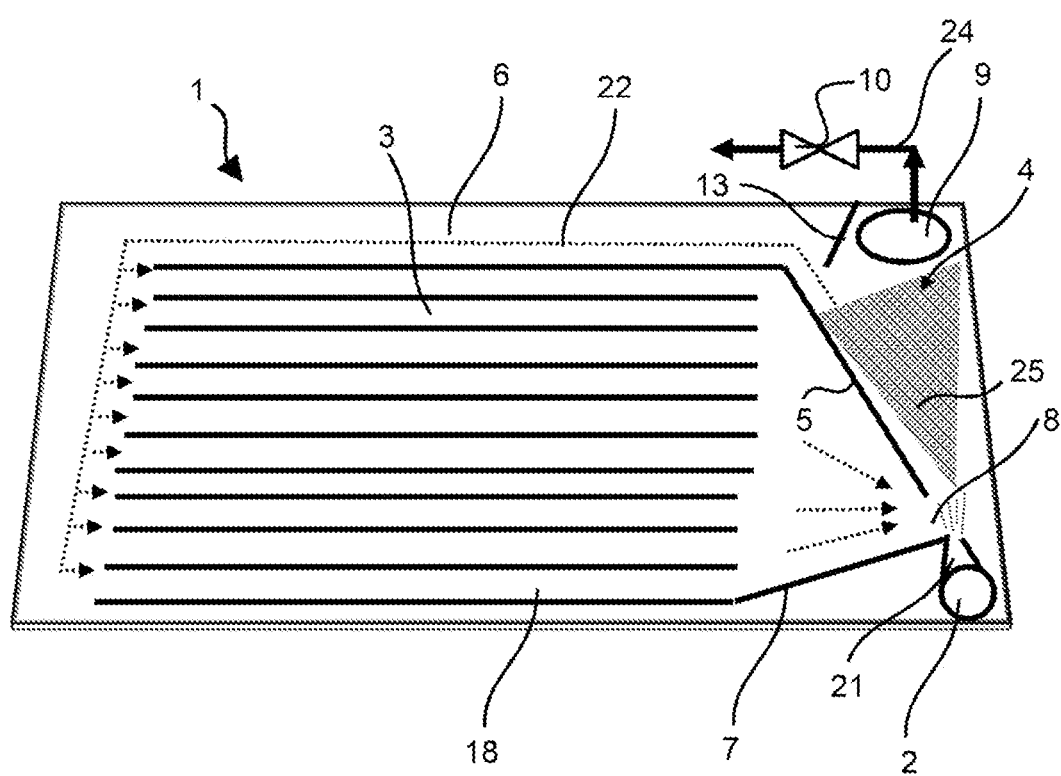

In the embodiment shown in FIG. 2, the water/gas separator 4 is formed as a knitted-fabric separator. In the present case, the knitted-fabric separator has a mesh, in particular a plastic mesh. The water is deposited on the mesh and intermediately stored in the mesh.

Figure 3:
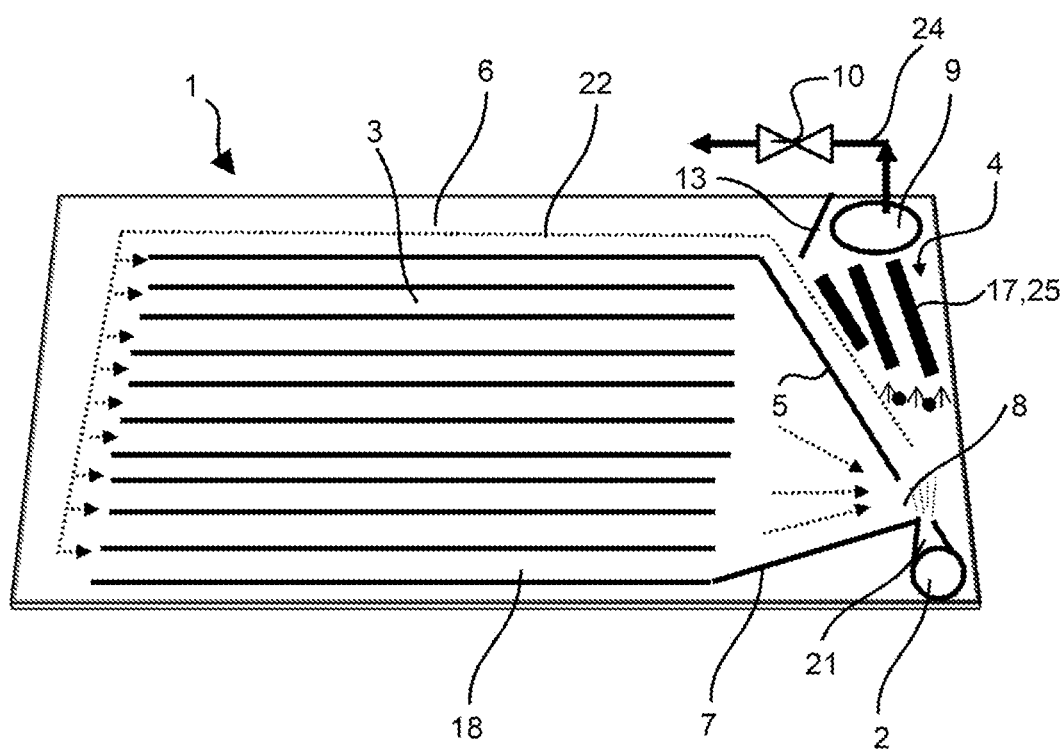

FIG. 3 shows an embodiment in which the water/gas separator 4 has a plurality of hydrophilic or hygroscopic bars 17. Liquid water and/or water vapor can be deposited on these bars 17 which are arranged approximately parallel to the wall 5. If the bars 17 take the form of hygroscopic bars 17, the separated water can also be absorbed into the hygroscopic bars 17 and temporarily stored.

Figure 4:
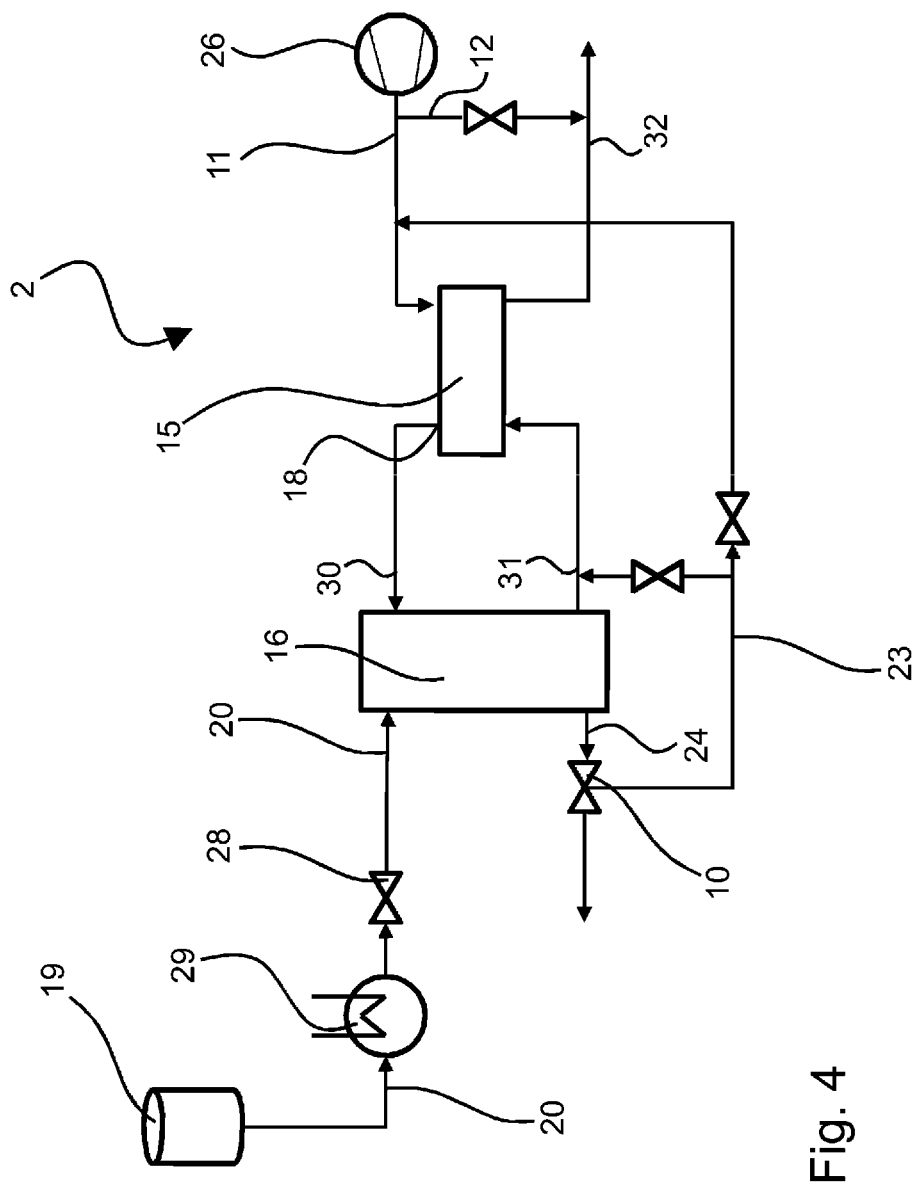
FIG. 4 shows a fuel cell system with a plurality of fuel cells comprising flow-field plates.

FIG. 4 shows a fuel cell system 2 having a fuel cell stack 16 which has a plurality of fuel cells arranged in a stacked arrangement, not shown in detail, each having at least one flow-field plate 1 described above. Each of the fuel cells not shown in detail is assigned an anode and a cathode, wherein the anode and the cathode are separated from each other by an ion-conducting polymer electrolyte membrane. Furthermore, the flow-field plate 1 which takes the form of a bipolar plate and serves to feed the reactants to the anodes and cathodes and also creates the electrical connection between the individual fuel cells is arranged between two such membrane electrode assemblies. A gas diffusion layer can be arranged between each electrode and the flow-field plate 1.

In order to supply the fuel to the fuel cell stack 16, the fuel cell stack 16 is connected on the anode side to an anode supply line 20 for supplying a hydrogen-containing anode gas from an anode reservoir 19 via a heat exchanger 29, such as in the form of a recuperator. The anode operating pressure on the anode side of the fuel cell stack 16 is adjustable via an anode actuator 28 in the anode supply path 20. On the anode outlet side, an anode exhaust gas line 24 is provided in which the liquid water separated inside or on the flow-field plates 1 can be discharged from the fuel cell stack 16 and removed from the fuel cell stack 16. Alternatively, the liquid water thus discharged can be supplied to the cathode side for humidifying the cathode gas by means of a liquid supply line 23. The anode exhaust gas line 24 is fluidically connected to the liquid supply line 23 which in turn is connected downstream of a compressor 26 and upstream of a humidifier 15 to a dry supply line 11. This makes it possible to supply the liquid water arising on the anode side to the humidifier 15 for humidifying the cathode gas. In the present case, the liquid water arising in the anode and deposited on the flow-field plate 1 can also be supplied to a cathode exhaust gas line 31 arranged on the cathode outlet side upstream of a humidifier 15. This likewise makes it possible to supply liquid water to the humidifier 15 for humidifying the cathode gas.

The cathode side of the fuel cell stack 16 is connected to the cathode supply line 30 for supplying the oxygen-containing cathode gas. A compressor 26 is arranged upstream of the cathode supply line 30 for conveying and compressing the cathode gas. In the design shown, the compressor 26 is designed as a compressor 26, which is mainly driven electromotively, and is driven by an electric motor, not shown in detail, equipped with appropriate power electronics. The cathode supply line in the present case is divided into two sections, namely a dry supply line 11 fluidically connecting the compressor 26 to the humidifier 15, and a cathode supply line 30 fluidically connecting the humidifier 15 to the fuel cell stack 16.

Via the compressor 26, the cathode gas drawn from the environment is passed directly to the fuel cell stack 16 via the cathode supply line 30. In addition, a bypass line 12 is provided for adjusting the cathode gas mass flow flowing through the cathode supply line 30 and fluidically connects the dry supply line 11 to a humidifier discharge line 32 arranged on the humidifier outlet side.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A flow-field plate for distributing a reactant to an electrode or a gas diffusion layer of a fuel cell, comprising:
   a gas inlet;
   a plurality of channels defining a flow field, wherein given a state of throughflow a pressure gradient is present between the gas inlet and the flow field which cases an exhaust gas flowing into the channels to be drawn toward the gas inlet; and
   a water/gas separator fluidically connected to the gas inlet for removing liquid water and/or water vapor from a gas which is connected to the flow field in order to supply the flow field with the gas removed in the water/gas separator, wherein a flow cross-section at the gas inlet or at a gas inlet region is smaller than the flow cross-section at or in a region of the water/gas separator.

2. The flow-field plate according to claim 1, wherein the flow cross-section between the gas inlet and the water/gas separator increases continuously.

3. The flow-field plate according to claim 1, wherein the increasing flow cross-section is formed by a wall running at an angle with respect to an extension direction of the channels.

4. The flow-field plate according to claim 3, wherein the wall is guided at an angle up to an edge-side channel assigned to the water/gas separator in such a way that the gas separated in the water/gas separator is guided exclusively into the edge-side channel in order to distribute it to the channels of the flow field.

5. The flow-field plate according to claim 3, wherein a second wall is provided in which the wall and the second wall are arranged facing each other, and a passage is formed between the wall and the second wall.

6. The flow-field plate according to claim 3, wherein the water/gas separator is assigned an outlet with an actuator for discharging liquid water temporarily stored in the water/gas separator, and a third wall is provided which is arranged between the outlet and the wall in such a way that the gas separated in the water/gas separator is guided to the flow field.

7. The flow-field plate according to claim 1, wherein the water/gas separator is formed as an impact separator with at least one baffle plate.

8. The flow-field plate according to claim 1, wherein the water/gas separator is formed as a knitted-fabric separator.

9. The flow-field plate according to claim 1, wherein the water/gas separator is formed as at least one hydrophilic or hygroscopic bar.

10. The flow-field plate according to claim 1, wherein an ejector is assigned to the gas inlet, and the ejector takes the form of a nozzle.

* * * * *